Nov. 2, 1943.  H. D. ROBINSON ET AL  2,333,391
AERODYNAMICALLY STABLE SUSPENSION BRIDGE
Filed Feb. 6, 1941  4 Sheets-Sheet 1
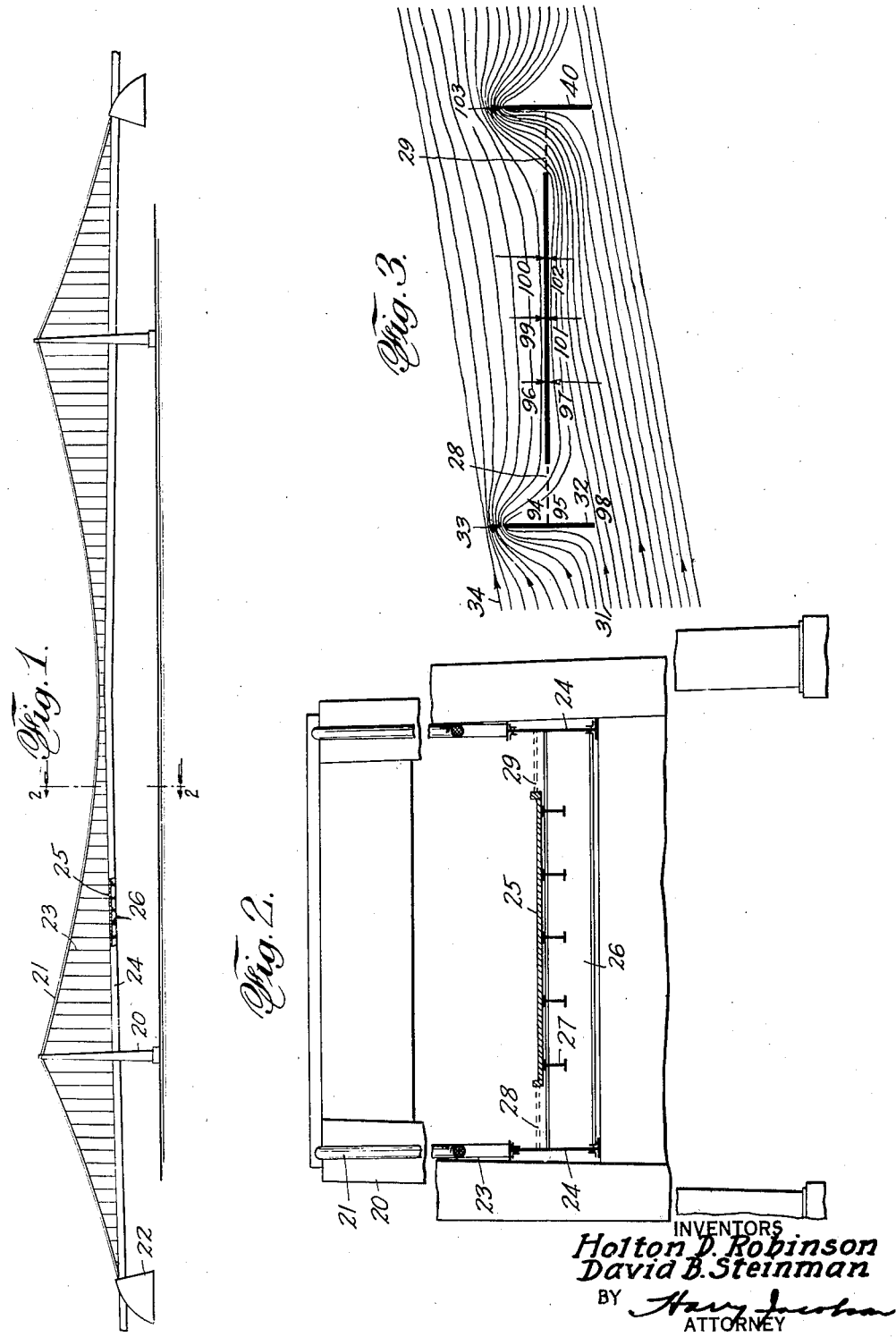
INVENTORS
Holton D. Robinson
David B. Steinman
BY
ATTORNEY

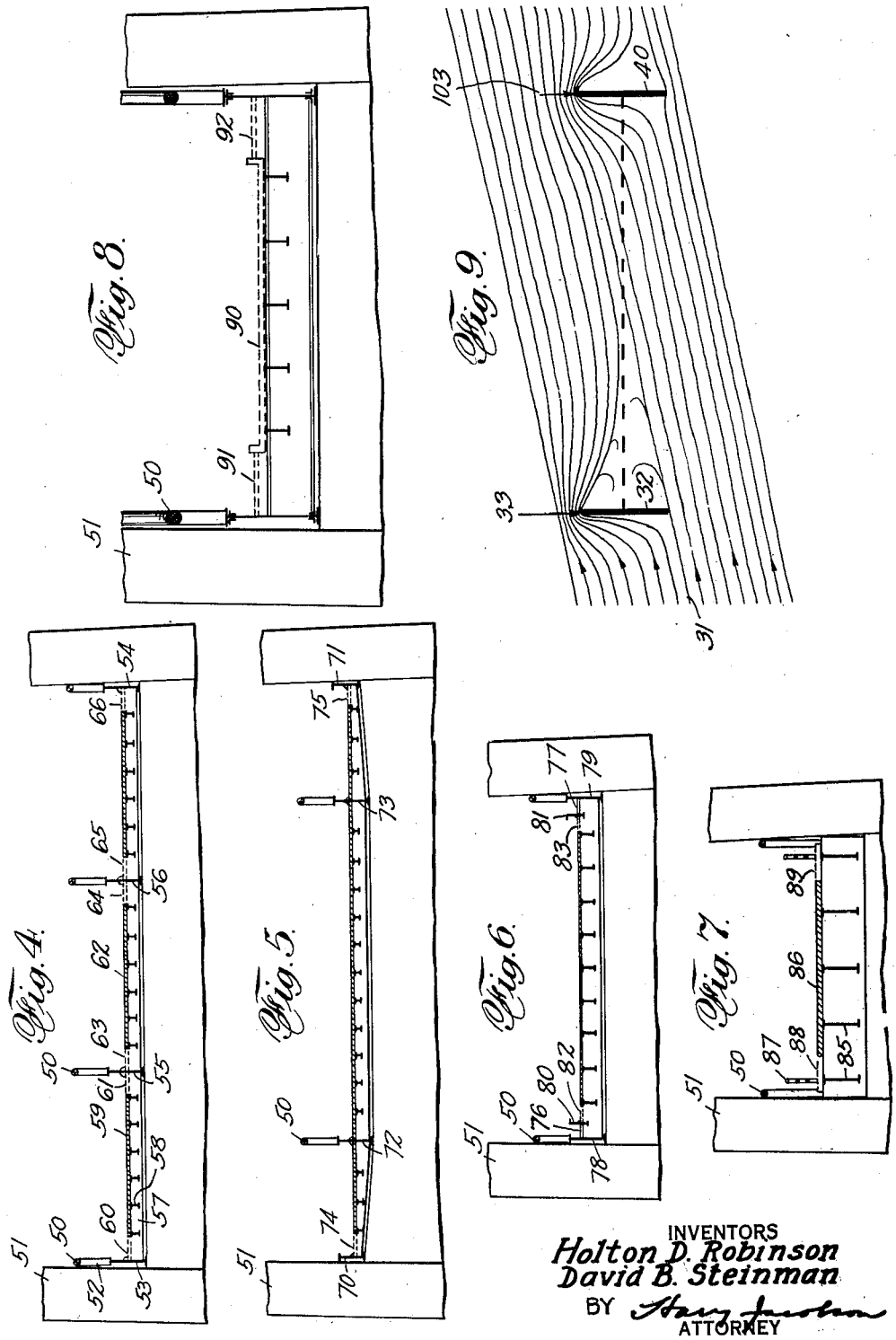

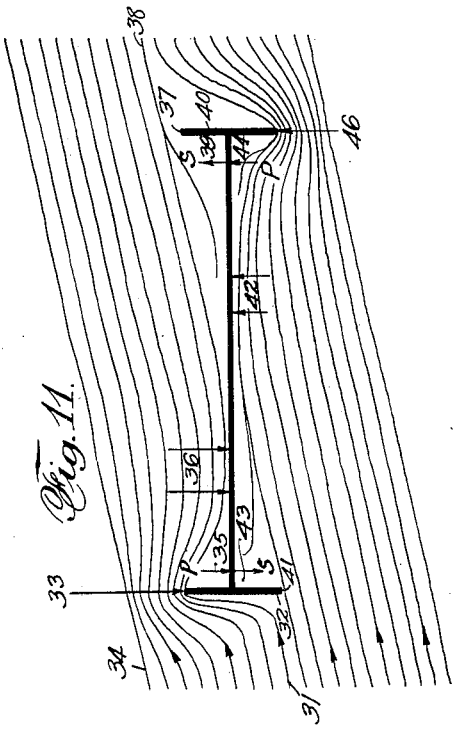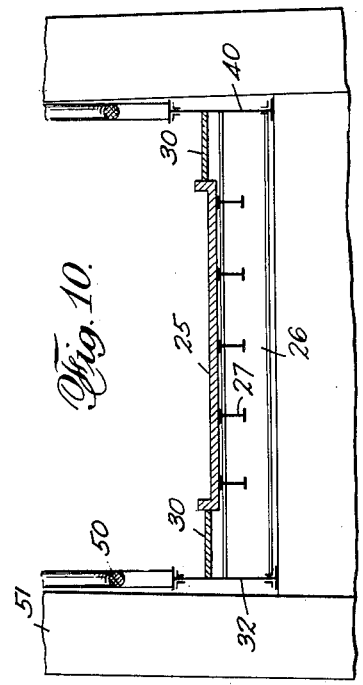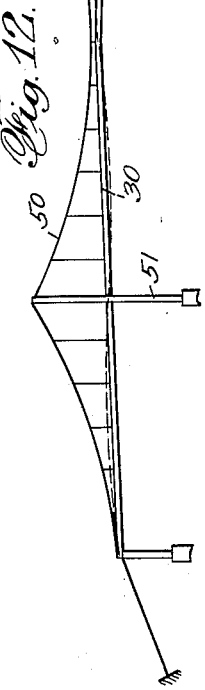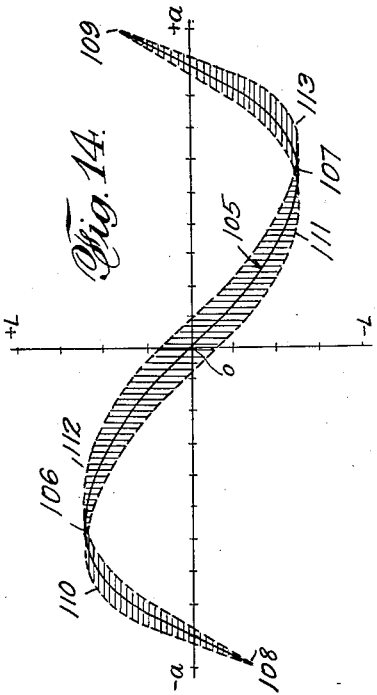

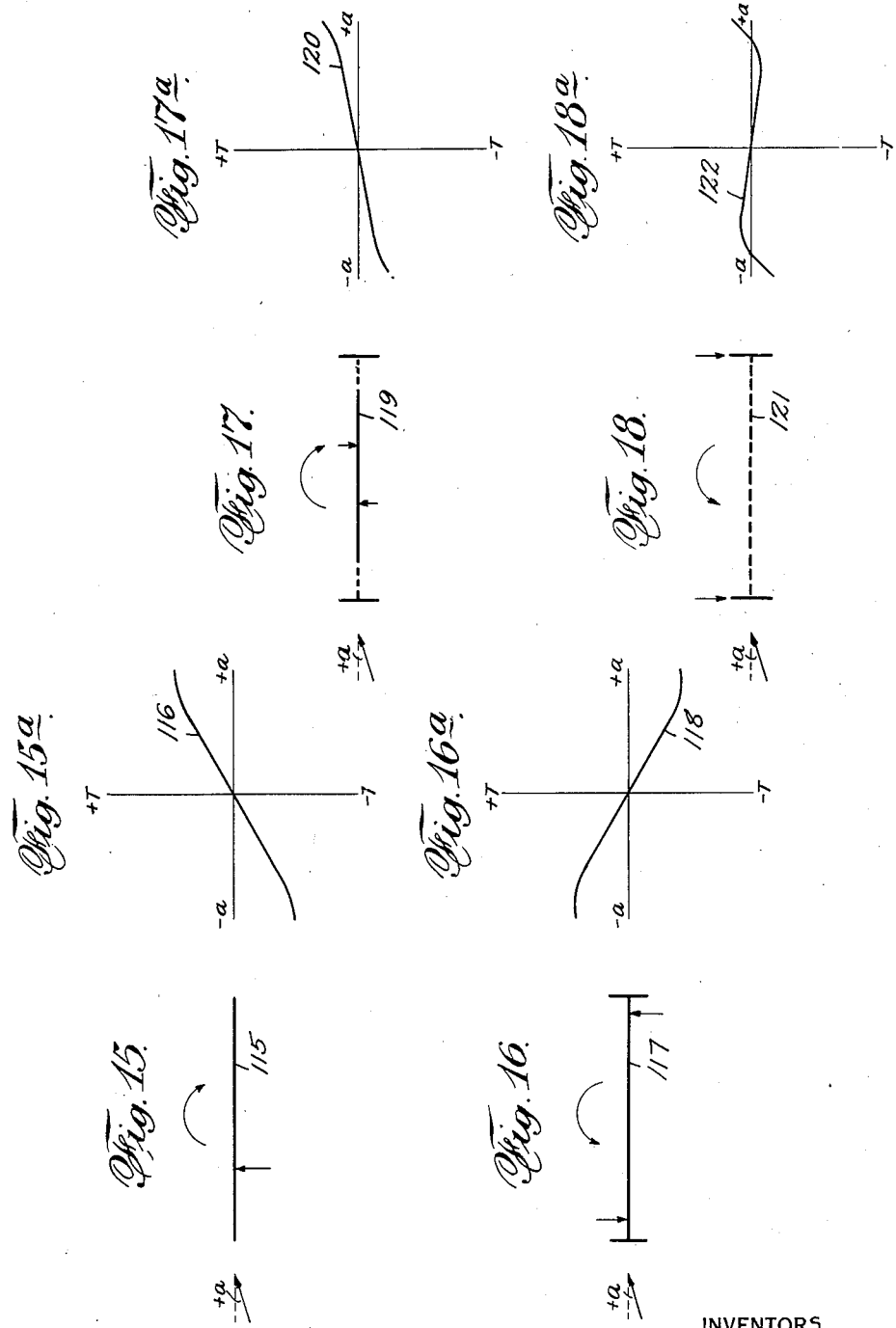

Patented Nov. 2, 1943

2,333,391

UNITED STATES PATENT OFFICE 2,333,391

AERODYNAMICALLY STABLE SUSPENSION BRIDGE

Holton D. Robinson and David B. Steinman, New York, N. Y.

Application February 6, 1941, Serial No. 377,683

1 Claim. (Cl. 14—18)

This invention relates to suspension bridges and particularly to the floor system of that type of such bridges wherein the span is long or wherein the ratio of the height of the stiffening members to the span is reduced in accordance with modern practice to a much smaller fraction than was thought a generation ago to be necessary for safety.

The trend of bridge design during the past generation has been toward increased slenderness or reduced rigidity of suspension bridges, for reasons of economy and aesthetics, until a border line has been reached in several recently built spans which developed disturbing harmonic undulations under certain wind conditions.

As is pointed out in the patent to Jacob London for Bracing for suspension bridges, No. 2,217,593, dated October 8, 1940, a steady quartering wind though of comparatively low velocity or intensity may initiate longitudinal or vertical oscillations, or both, in the suspended structure of suspension bridges of long span or of low rigidity or of low vertical and torsional stiffness. Whether the oscillation is first induced by the action of the wind on the floor or roadway of the bridge owing to its camber or by the action of any other forces, once the movement is initiated it tends to become harmonic and to increase even though the wind velocity does not increase, if the cross-section of the suspended structure is such that said structure does not possess aerodynamic stability.

By means of simple aerodynamic models of bridge cross-sections we have explored and demonstrated the conditions that produce a building up of harmonic undulations to dangerous proportions, even in a mild wind. When the cross-section possesses the inherent characteristics of "aerodynamic instability," the models show the cumulative development of high amplitude oscillations of the character and proportions that caused the failure of the Tacoma Narrows bridge and the disturbing oscillations of other recently built suspension bridge spans. These model tests demonstrate the dynamic effect of a steady wind in producing harmonic oscillations of gradually increasing amplitude. A bridge may be perfectly safe for all of the normal design loads and forces, namely, vertical loading and static effect of wind; but if its cross-section possesses inherent aerodynamic instability, it may be destroyed by the cumulative dynamic effect of a steady wind of moderate proportions. Such wind pressure may be only a minor fraction of the intensity of the static wind pressure which the structure is designed safely to withstand.

We believe that a primary element in producing the aerodynamic oscillations is a pressure difference above and below the solid roadway or horizontal floor heretofore invariably used in suspension bridges. We believe that, by providing gaps or openings in the regions where such pressure differences occur, the differences are equalized and eliminated, and that in spite of the decreased weight and consequent decrease in stiffness, the reduction of vertical wind forces and the reduction or elimination of the cumulative dynamic effect of such wind forces outweigh any disadvantage of the lighter weight of any open bridge floor for suspension bridges. On the other hand, a bridge cross-section composed of two or more vertical stiffening girders or their wind deflecting equivalents, with a solid roadway between them (as in Figs. 10, 11, 13 and 16) is likely to possess aerodynamic instability. This is revealed in wind-tunnel tests on a scale model of a roadway of the cross-section referred to, and is indicated by a descending slope in the plotted graph of lift coefficients for varying angles of attack (Fig. 14) later to be explained in detail. Aerodynamic instability is also revealed and demonstrated by scale models, elastically restrained, exposed to the steady breeze of an electric fan. If the cross-section is aerodynamically unstable, the model (like the prototype) will develop cumulative harmonic oscillations of increasing amplitude (Figs. 12 and 13).

We have discovered, by such aerodynamic model tests confirmed by analysis, that bridge floors of such cross-section can be made aerodynamically stable by providing gaps or openings in the roadway adjacent to or in quite close proximity to the supporting girders, and should be in width at least half of the height of the stiffening girders.

Throughout this specification, it is intended that the terms "stiffening girder" and "supporting girder" be given their general meanings equivalent to the stiffening or supporting element employed in the suspended structure of a suspension bridge regardless of its shape or construction, and to include solid web plate girders, box girders, open web girders, open trusses or any other vertical stiffening construction of the suspended structure.

The term "roadway" as used herein is to be given its general meaning to include any horizontal deck for carrying vehicles and pedestrians, and therefore to include any sidewalks as well as vehicular roadways and railways.

It will be understood from the analysis hereinafter given in detail that any substantially vertical surface of substantial area arranged along or adjacent to the longitudinal edges of the suspended structure and acting as a wind deflecting surface, may in connection with a roadway which has solid sections inwardly adjacent to such surface, whether the remaining part of the roadway is open or not, be not possessed of aerodynamic stability. This is true where the surface referred to is the surface of a vertical stiffening girder or of road guards or of facia, or wind guards or the like.

Consequently, our invention contemplates the provision of a suspension bridge possessed of aerodynamic stability and which includes a substantially horizontal roadway having gaps, apertures, slots or other openings or open work therein adjacent or quite close to the outermost longitudinal wind deflecting surfaces thereof, whereby the known advantages of reduced rigidity may be retained and the bridge designed accordingly.

Our invention further contemplates the provision of open mesh or open grating construction for the sidewalks or the longitudinal edge parts of the otherwise solid surfaced roadway of a suspension bridge, whereby aerodynamic pressures on the upper and lower surfaces of the suspended floor or roadway of the bridge are substantially equalized.

Our invention further contemplates the provision of open mesh or open grating construction or gaps, apertures, slots or other openings or open work not only adjacent the outer vertical wind deflecting the surfaces of the suspended structure, but also at other areas of the roadway of the suspended structure and even over the entire roadway, if desired or found convenient.

Our invention further contemplates the provision of a simple and inexpensive method of insuring the aerodynamic stability of a suspension bridge consisting of providing wind or air flow passages at selected areas of and through the floor system of the suspension bridge.

In what follows, we have illustrated various practical embodiments of our invention by way of example and we have also illustrated diagrammatically our theory of the action of the dynamic wind forces on "open" and "closed" suspended structures of various cross-sections more adequately to illustrate the basis of our invention and we have further analyzed and plotted a wind lift diagram and a dynamic wind diagram for the Tacoma Narrows bridge, as well as torque diagrams for suspended structures of different cross-sections. Some of the illustrative embodiments of our invention are shown in the accompanying drawings, in which, Fig. 1 is a side elevation of a suspension bridge of the type having low rigidity, partly broken away to show the roadway provided with openings at its longitudinal edge parts adjacent the stiffening girders, and otherwise solid or "closed."

Fig. 2 is a vertical section of the same taken on the line 2—2 of Fig. 1, foreshortened in height and illustrating in dotted lines the openings at the longitudinal edge parts of the roadway.

Fig. 3 is an approximate diagram of the air flow produced by lateral wind with a small upward angle of attack on a suspended structure having substantially the cross-section shown in Fig. 2.

Fig. 4 is a vertical section similar to Fig. 2 of a modified form of a suspended structure, wherein more than two stiffening girders are employed.

Fig. 5 is a similar view of another modified form of the suspended structure having outer facia girders; or having outer railings provided with vertical surfaces of substantial height; or having high outer curbs.

Fig. 6 is a similar view of another modified form of the suspended structure having comparatively narrow sidewalks and having inside facia girders or railings provided with vertical wind deflecting surfaces of substantial height.

Fig. 7 is a similar view of another modified form of the suspended structure having no outside stiffening girders, but having comparatively deep vertical stringers carrying the roadway, and thereby presenting outer wind deflecting surfaces.

Fig. 8 is a similar view of still another modified form of the suspended structure, wherein the roadway is shown in dotted lines and comprises open mesh or open grating throughout the entire width of the roadway between the stiffening girders; or including apertures, slots or other openings extending throughout the entire width of the roadway.

Fig. 9 is an approximate air flow diagram, similar to Fig. 3, applied to a suspended structure having the cross-section of Fig. 8.

Fig. 10 is a vertical section of a suspension bridge having a closed roadway of the type heretofore generally used in suspension bridges and which is aerodynamically unstable.

Fig. 11 is an approximate air flow diagram of the cross-section of the suspended structure, similar to that of Fig. 10, showing that said cross-section does not have aerodynamic stability.

Fig. 12 is a side elevation of a suspension bridge having the standard typical roadway cross-section shown in Fig. 10, this figure showing in dotted lines the cumulative vertical deflections of the suspended structure by certain winds and showing that the bridge is not aerodynamically stable.

Fig. 13 is a vertical section of the closed roadway of the same bridge showing the positions assumed by the roadway when the harmonic oscillations or the responses to resonance of the bridge have been built up or accumulated close to their maxima.

Fig. 14 is a full line graph of lift L for varying angles of attack $a$ and showing in dotted lines the dynamic shifting of the graph to the left and to the right respectively owing to the rotation of the suspended structure about a substantially horizontal longitudinal axis.

Fig. 15 is a diagram of a roadway of uniform cross-section showing the forces resulting from a wind having an angle of attack $a$.

Fig. 15a is a torque graph of the cross-section of Fig. 15 corresponding to different angles of attack.

Fig. 16 is a diagram of the standard cross-section of the suspended structure shown in Figs. 10, 11 and 13 showing the forces acting thereupon, and Fig. 16a is the torque diagram therefor.

Fig. 17 is a diagram showing the forces acting upon a suspended structure of the preferred cross-section which is aerodynamically stable and such as is illustrated in Figs. 2 to 7 inclusive, and Fig. 17a is the torque diagram therefor.

Fig. 18 is a diagram showing the forces acting upon a roadway of open cross-section such as is illustrated in Figs. 8 and 9, and Fig. 18a is a torque diagram therefor.

Referring now to Figs. 1 and 2, we have there shown a suspension bridge embodying our invention. As is customary, the towers 20 support the cables 21 which are anchored in suitable anchorages 22. Suspended from the cables as by means of the suspenders 23 are the stiffening trussses or girders 24 which in turn support the roadway 25. As is best seen in Fig. 2, the floor or roadway is supported by the transverse floor beams 26 extending between the stiffening girders 24 and in turn supporting the spaced floor stringers 27. Preferably, the entire longitudinal edge portions of the floor or roadway are made with suitable vertical air flow or wind passages or openings as 28, 29 therein preferably immediately adjacent the stiffening girder and extending inwardly therefrom across the width of the floor a distance equal at least to half the height of said stiffening girder. The function of said openings is to permit the wind to pass therethrough from over the top or from under the bottom of the girders 24 where the wind pressure is built up to a substantial degree depending upon the angle of attack of the wind. Said openings thereby permit the equalization of the pressure upon the intermediate solid portion of the roadway 25. It will be understood that where openings such as 28, 29 are mentioned herein, it is not intended that a completely unobstructed space be provided since various apertured structures effective to permit substantially free air flow or passage of the wind therethrough may be arranged in the openings. Such structures may take the form of suitable gratings having openings therein of greater area than the area of the material forming the gratings, or suitable mesh may extend across the openings in a manner which will now be clear to those skilled in the art. Similarly, suitable perforated or slotted means or means provided with gaps of comparatively large area may extend across or bridge the openings so that such means as mesh, gratings and the like may be used as part of the roadway to carry vehicles and pedestrians. The openings therefore are not waste areas of the floor or roadway, but are capable of utilization to the same extent as the remaining solid portion 25 of the roadway. Since the utilization of mesh, gratings, or other means spanning the openings will be obvious from what has been said, no additional illustration thereof is deemed necessary other than the dotted lines illustrated as extending across the openings.

It will further be understood that the gaps or openings may be provided at points other than immediately adjacent the stiffening girders with the same effect dependent upon the floor construction. As shown in Fig. 4, the cables 50 are supported by the towers 51 and by means of the suspenders 52 support the suspended structure. Said structure comprises the outer stiffening girders 53, 54 and the intermediate stiffening girds 55, 56. The floor beams 57 extend between the girders 53, 55 while similar floor beams extend between the other girders. The longitudinally arranged floor stringers 58 support the closed floor or roadway 59 providing the gaps 60, 61, adjacent the respective stiffening girders 53 and 55. Similarly, the closed roadway 62 terminates inwardly of the stiffening girders 55 and 56 to provide the gaps 63, 64 adjacent said girders. The gaps 65, 66 are also arranged respectively on the other side of the girder 56, and adjacent the girder 54. This construction is merely a duplicate of the structure hereinbefore explained in connection with Fig. 2, the gaps or openings being on the inside of the outermost stiffening girders and on both sides of the intermediate stiffening girders. The vertical pressures on the closed portions of the floor are thereby substantially equalized.

As shown in Fig. 5, outer facia girders as 70, 71 are there provided. The members illustrated at 70, 71 may also represent outer railings having vertical surfaces of substantial height or they may represent high outer curbs on the floor. The intermediate stiffening girders 72, 73 may serve as the main stiffening members, but no openings in the floor need be provided adjacent thereto because of the vertical wind deflecting surfaces of substantial areas on the comparatively high members 70 and 71. Consequently, the floor openings are arranged at 74, 75 only, at the floor areas adjacent the respective outer wind deflecting members 70 and 71.

In the form of the invention illustrated in Fig. 6, comparatively narrow sidewalks as 76, 77 are arranged immediately inside of and adjacent the respective stiffening girders 78, 79. Since, however, inside facia girders 80, 81 are provided quite close to and inside of the respective stiffening girders 78, 79, said facia girders act as wind deflecting members and consequently the gaps or openings at 82, 83 are provided respectively inside of and adjacent the facia girders 80, 81. The members illustrated as 80, 81 may also be railings having vertical wind deflecting surfaces of substantial height and area. In the form of the invention shown in Fig. 7, no outside stiffening girders are provided, but in place thereof the longitudinal vertical stringers 85 of substantial height and carrying the floor or roadway 86 are provided. Since the vertical railings as 87 are open and do not constitute material wind deflecting surfaces, the outermost stringers 85 only constitute said surfaces and consequently the openings 88, 89 are provided in the floor immediate inside of the respective outermost stringers.

In Fig. 8, we have shown a construction similar to that of Fig. 2 excepting that the roadway 90 is of open work throughout its entire width. Suitable open work sidewalks or auxiliary roadways or the like 91, 92 may be provided at the sides of the central roadway part and suitably supported. As hereinbefore indicated, the open work may consist of open mesh or open grating construction or other suitably apertured or slotted means providing a floor for vehicles or pedestrians or both through which the wind can pass with ease and without material hindrance or deflection.

In Fig. 10, we have shown a bridge construction substantially identical with that shown in Figs. 1 and 2 excepting that the gaps or openings 28 and 29 have been closed by the solid roadway portions 30. As has been hereinbefore explained, such is the typical roadway hereinbefore invariably used for suspension bridges and which we have altered by omitting said closed sections 30 and substituting therefor gaps or openings, spanned if desired, by suitable open work. The aerodynamic instability of the floor or roadway of the cross-section shown in Fig. 10 will be seen from the air flow diagram therefor shown in Fig. 11 when the wind has a small positive (upward) angle of attack.

The inclined air stream 31 meeting the windward vertical girder 32 is deflected upwardly to the point 33 and there meets the undeflected wind stream 34 above the top edge of the vertical girder. This builds up a crowding of air flow at 33, producing a high intensity of pressure at that point. This high intensity of pressure acts downwardly on the top flange of the girder, which however presents only a comparatively small area. The air escaping downwardly by stream flow and eddies, from the high pressure region 33, produces a pocket of compressed air at 35. The intensity of pressure at 35 is reduced from that at 33, but it acts on a much larger area, namely, the solid area of the horizontal bridge floor to the leeward of and adjacent to the vertical girder 32. The downwardly deflected air stream from 33 then impinges on the solid horizontal roadway in the region 36 where it produces an additional downward pressure. After impinging on the roadway at and near the region 36, the air stream is deflected upwardly to escape over the top edge 37 of the leeward girder 40, where it rejoins the undeflected air stream at 38. The velocity of the air flow at 37 draws with it, as an induced flow, some of the air from the corner pocket 39, producing a partial vacuum or suction in that pocket, which is represented by an upward force acting on the solid floor to the windward of and adjacent to the leeward vertical girder 40. The air stream below the floor, passing below the windward girder at 41, impinges on the bottom of the solid horizontal floor in the region 42, producing an upward pressure there. Also, by its velocity, it produces an induced flow drawing some of the air from the corner pocket 43, creating a suction or partial vacuum there and thus producing a further downward force on the solid floor to the leeward side of the windward girder 32. At 42, the air stream is deflected downwardly by the solid floor, the air pocket 44, and the vertical girder 40. This downwardly deflected air stream meets the undeflected air stream at 46, building up high intensity of pressure at this point. This high pressure acts on the comparatively small area of the bottom flange of the girder at 46, producing an additional upward force. The compression pocket 44 also produces upward pressure, smaller in intensity but acting on a much greater horizontal area.

It is thus seen that the distortion of the air flow by the bridge floor of solid cross-section, when the effective wind direction is inclined slightly upwardly, produces in general downward forces acting on the windward half of the bridge cross-section and upward forces on the leeward half of the bridge cross-section. The resulting couple produces a torque or twist on the cross-section of the bridge, tending to set up torsional or transverse oscillations of the flexible span, as is shown in Fig. 13. Moreover the relation of resultant forces to the direction of the wind, with resultant forces acting downwardly on the windward girder and the adjoining area of solid roadway when the wind is inclined upwardly, is a condition of aerodynamic instability. This means a susceptibility to the building up of harmonic oscillations of increasing amplitude, far beyond any static effect of the same wind pressure.

It will be noted, in Fig. 11, that the four closed corners between vertical girders and the solid horizontal floor become, alternately, pockets of compression and suction, designated in the drawings by the arrows P and S respectively. The interposed solid floor enables these pressure differences to be maintained and prevents equalization of these pressures. These unequalized pressure differences, between the areas 35 and 43 behind the windward girder and between the areas 39 and 44 in front of the leeward girder, constitute the principal elements in producing the torsional unbalance and instability. Providing open areas, slots, or other openings in the horizontal floor in these corner regions permits equalization and neutralization of these pressure differences, and eliminates in large part the horizontal area on which these pressure differences act. This eliminates or substantially reduces the torsional unbalance and the aerodynamic instability of the cross-section.

In Fig. 11 (also in Figs. 3 and 9), the wind direction is shown inclined slightly upwardly, corresponding to a positive angle of attack. Obviously, if the direction of the wind is reversed, i. e., inclined slightly downwardly, the diagrams of air flow and of the resultant pressure and suction forces will be simply reversed correspondingly and symmetrically about the horizontal axis, except for any deviations of the cross-section from symmetry about the same horizontal axis. The same general analysis and conclusions will apply, with up and down directions simply reversed. In either case, a torsional couple is developed, with the vertical forces on the windward girder and adjacent width of the horizontal floor directed downwardly when the wind is inclined upwardly and directed upwardly when the wind is inclined downwardly. Moreover, the vertical forces on the windward girder and adjacent floor will generally be greater than the vertical forces of opposite direction on the leeward girder and adjacent floor, so that the total resultant vertical force (lift or negative lift) will generally be opposed to the direction of inclination, upward or downward, of the wind relative to the cross-section. Within a certain range of inclinations, any differential change in inclination of the wind, upward or downward, will produce a differential change in the total resultant lift in the opposite direction. This is an essential condition of aerodynamic instability.

Fig. 3 shows by the approximate air flow diagram around and through a floor having a cross-section with longitudinal edge openings how such openings insure aerodynamic stability, as compared with Fig. 11. In Fig. 3, the inclined wind stream 31 meeting the windward vertical girder 32 is deflected upwardly to 33 and there meets the undeflected wind stream 34 above the top edge of the vertical girder. This builds up a high intensity of pressure at 33, but this acts only on the comparatively small area of the top flange of the vertical girder. Between the spaces 94 and 95, the floor is open, so that there is little or no horizontal area in this region on which any wind force due to difference of pressure can act; and, moreover, the absence of a solid partition at 28 and between the spaces 94 and 95 prevents the formation of a difference of pressure between these two regions. Beyond the point 33, the air stream, under pressure, is deflected downwardly toward the top of the solid floor at 96, and part of it may pass below the solid floor at 97. Undeflected air stream from 98 below the girder 32 also reaches the underside of the solid floor at 97. There results a downward pressure on the solid floor at 96, 99 and 100, and a generally greater upward pressure on the solid floor at 97, 101, 102. The air streams above and below the solid floor unite beyond 100 and 102 after they pass through the opening 29, and are then deflected upwardly by the leeward vertical girder to produce high crowding over the top 103 of the leeward girder. The high vertical pressure at 103 acts only on the small area of the top flange of the girder 40. At the opening 29, there is no solid floor to maintain any difference of pressure nor to be acted on by any such difference of pressure. Beyond the girder 40 the divided air stream unites again, as shown.

It will be observed from Fig. 3 that, in this case, the vertical forces or wind pressure act generally in the same direction on both girders or on both halves of the cross-section. The downward forces acting on the tops of the two girders are comparatively small, since the presented horizontal areas are comparatively small. On the other hand, the upward forces on the underside of the solid floor at 97, 101, 102 are generally larger than the downward forces on the upper side of the solid floor at 98, 99 and 100. This excess of upward pressure on the solid floor tends to balance or outweigh the small downward forces on the tops of the girders at 33 and 103. It is thus seen that the torsional couple on the cross-section will be very small or zero, and the total resultant vertical force will be very small and generally upward, i. e., the lift will be small and generally positive, or in the same general vertical direction as that of the resultant wind. The essential conditions of torsional unbalance and of aerodynamic instability have therefore been eliminated. Moreover, the air flow along the top and underside of the middle strip of solid floor will act as a stabilizing and damping agent to check and stop any harmonic undulations (up and down) or any harmonic oscillations (rotation or twist).

If the inclination of the wind in Fig. 3 is reversed, that is, if it is inclined downwardly instead of upwardly, a similar air flow diagram would result, with the resultant pressure forces similar but reversed in vertical direction.

Our dynamic wind model tests show that cross-sections of the form represented diagrammatically in Fig. 3 are aerodynamically stable, i. e., secure against the setting up of cumulative vertical undulations or torsional oscillations. We have further discovered, by such model tests and experiments, that, for substantial aerodynamic stability of the cross-section, the opening or gap in the horizontal floor adjacent to and just inside each vertical girder should be at least one-half the total vertical height of the girder. Even narrower slots or openings, however, produce a marked reduction in the aerodynamic instability of the cross-section.

Fig. 9 shows diagrammatically the general paths of air flow around and through a bridge floor having a cross-section open or substantially open for its full width between the vertical stiffening girders. The wind stream 31 inclined slightly upwardly and deflected by the windward girder, follows the general path shown. The air flow misses the bottom of the windward girder 32, but is deflected by the leeward girder 40 and follows a similar path. Another part of the air flow, missing the bottom of the leeward girder, continues on therepast without deflection. Crowding of air lines occurs at the top of each girder, producing downward pressure at 33 and 103. These high intensities of downward pressures act only on the horizontal areas of the top flanges of the two girders. A torsional couple does not appear in this diagram. Absence of solid floor adjacent to each girder prevents the formation of pressure and suction pockets of unbalanced pressure. This cross-section thus eliminates or reduces the principal elements of aerodynamic instability shown in Fig. 11. It is however less secure against aerodynamic instability than the cross-section of Fig. 3 since it lacks the stabilizing or balancing forces acting on the solid middle section of the floor in Fig. 2 and the damping action of said solid middle section of floor. Each girder in Fig. 9 is subjected to a downward pressure when the wind is inclined upwardly, and each girder may therefore possess separate aerodynamic instability. The two girders may start harmonic vertical motions in either the same or opposite phase, and the resulting changes and alternations of lift forces may tend to cause cumulative increase of amplitudes. The vertical forces involved are small, but the damping elements of Fig. 3 are missing. We believe, therefore, from our tests and our analysis, that the fully open cross-section of Fig. 9 is inferior to the partially open cross-section of Fig. 3.

In the past, only solid floors have been used on suspension bridges in the belief that their greater weight is necessary to reduce deflections and oscillations. We find that, on the contrary, open work floors may advantageously be used for all or part of the width of a suspension bridge floor, the reduction of vertical wind forces and the reduction or elimination of the cumulative dynamic effect of such wind forces outweighing any disadvantage of the lighter weight of an open bridge floor for suspension bridges.

Lift diagrams or graphs in which the ordinates are the lift forces, and the abscissas are the angles of attack corroborate the analysis of stability and instability deduced from the air flows diagrams Figs. 3, 9 and 11. The full line 105 of the graph shown in Fig. 14 is a graph of lift L for varying angles of attack $a$. If the floor has a cross-section which is aerodynamically unstable, a portion of the graph has a descending or negative slope. The line 105 is a graph based on the behavior of the floor of the Tacoma Narrows bridge. The portion 106—107 of said line has the objectionable descending or negative slope from left to right. At 106, a negative or downward angle of attack ($-a$) shows a positive or upward lift ($+L$). At 107, a positive or upward angle of attack ($+a$) shows a negative or downward lift ($-L$). Between these points, the graph 106—107 slopes downwardly, i. e., an increase in upward angle of attack produces a decrease of lift or an increase of negative lift ($-L$). If at any point of the graph between the points 106 and 107 the negative slope, measured in radians, exceeds the drag for that point, the cross-section will be definitely unstable under wind pressure at that angle of attack. When this relation obtains, any small upward change in the relative direction of the wind will produce a net downward change in the direction of the total resultant pressure on the section, or in the vertical component of the total resultant pressure on the section. Downward motion of the section, by composition of relative motions, produces an upward change of the effective direction of the wind and, therefore, a downward change in the direction of the total resultant pressure or in the vertical component of said total resultant pressure. Thus there is produced a resonance or harmonic synchronization of direction of motion with direction of differential resultant pressure. This spells aerodynamic instability, or an automatic conversion of static wind into a synchronizing dynamic force producing cumulative increase of energy and consequently cumulative increase of amplitude of vertical undulation.

The foregoing analysis does not take into account the additional possibility of cumulative angular or torsional oscillations. We have discovered that this also may be deduced scientifically from the same lift graph 105 of Fig. 14, as follows:

In the portions 108—106 and 107—109 of the graph 105, increase of angle of attack (+a) produces increase in positive lift (+L). In the portion 106—107, increase of angle of attack produces decrease of positive lift. If the wind is substantially constant in direction, angular rotation of the section, by composition of velocities, produces changes in the resultant effective direction of the wind. When the leading edge of the structure (or windward girder) is moving downwardly, the effective resultant direction of the wind is shifted upwardly, or the effective angle of attack (+a) is slightly increased. This produces increase of positive lift in the regions 108—106 and 107—109 and decrease of positive lift in the region 106—107. Consequently, the lift graph is shifted to the left to the modified dotted line position 108—110—111—109. Similarly, when the leading edge (or windward girder) is moving upward, the lift graph is shifted to the right to the modified dotted line position 108—112—113—109. In the middle range of amplitudes 106—107, the lift is increased when the section is rotating upwardly, and reduced when the section is rotating downwardly. Since the resultant total lift is practically always to the left of the center line, the difference of these lift forces in the two directions of rotation is such as to increase the amplitude of rotation, and this spells instability.

The diagram (Fig. 14) may be viewed as analogous to a "hysteresis" diagram. For upward rotation, the lift graph is 108—112—113—109; for downward rotation the lift graph is 108—110—111—109. The areas between these two divergent curves are proportional to energy (moment multiplied by angular rotation). In the region 106—107, the energy area is positive, representing energy imparted by the wind to the oscillating system in one oscillation. In the regions 108—106 and 107—109, the energy areas are negative (or damping), representing energy withdrawn by the wind from the oscillating system in one complete oscillation. Starting at the origin, in the region of small amplitudes, only the positive energy area comes into play at first, progressively increasing the amplitude of the periodic oscillations. After a while, the increasing amplitudes extend into the regions of the negative energy areas, but the amplitudes keep on increasing until they reach a limiting range in which the negative energy areas balance and neutralize the large middle area of positive energy input.

The significance, which we have discovered, of the downward or negative slope of a portion of the lift graph as demonstrating a tendency to produce cumulative angular or torsional oscillations of a cross-section, has been hitherto missed by authorities on the subject. It explains the catastrophic torsional oscillations, with an amplitude of +45° (Fig. 13), which produced the failure of the Tacoma span.

The closed floor cross-section of Figs. 10, 11 and 16 not only possesses a lift graph with the instability characteristics shown in Fig. 14, but in addition it shows a large rotating couple or torque tending to initiate the dangerous angular oscillations above described. The cross-section open along the longitudinal edge portions (Figs. 2–7 and 17) substantially or completely eliminates the descending slope or instability portion from its lift graph and, moreover, lacks the initiating couple or torque; moreover, it develops a strong damping or steadying action through the middle solid section of floor acting against the air flow above and below it. The completely open section Figs. 8, 9 and 18 retains some negative or instability slope in its lift graph, but the lift forces (and therefore the differential lift forces) are small and may be too small to build up cumulative amplitudes against the elastic resistances and damping elements in the structure.

In Fig. 14, we have shown the lift graph passing through the origin of coordinates, corresponding to a cross-section symmetrical about a horizontal axis. If the cross-section is not symmetrical about a horizontal axis, the L-axis in Fig. 14 will be lowered or raised, according to whether positive or negative lift forces predominate.

A horizontal plate in lateral wind is aerodynamically stable against vertical or angular oscillations, since any vertical or angular oscillation will always create a differential pressure opposing it. Its lift graph always has a positive slope. For this reason, the solid central horizontal slab, with open side edge portions in Fig. 3, will have a definite stabilizing or damping value. This beneficial element is lacking in Fig. 9.

Another method which we have devised for studying the torsional instability of sections under air flow is to plot the torques (or rotational moments about the center of rotation) for different angles of attack. Upward angles of attack are positive and clockwise torques are positive. Such torque graphs are represented approximately in Figs. 15a, 16a, 17a and 18a for the respective sections shown in Figs. 15, 16, 17, and 18. In Fig. 15a, for a simple flat horizontal plate 115, Fig. 15, positive angle of attack produces positive torque; hence the torque graph 116 has a positive slope throughout. This shows torsional stability, or aerodynamic damping of torsional oscillation. In Fig. 16a, for a closed bridge floor cross-section 117 having vertical wind deflecting surfaces at its edges, a positive angle of attack produces negative torque; hence the torque graph 118, Fig. 16a has a substantial negative slope. This shows torsional instability, or aerodynamic building up of torsional oscillations. The torsional velocity of the section in the direction of the arrows of Fig. 16 produces, by composition of relative velocities, an increase in the angle of attack and this in turn produces an increase of the torsional forces in the direction of the rotation. This automatic aerodynamic resonance produces cumulative increase of amplitude of oscillation.

In Fig. 17, for a bridge floor cross-section 119 with side edge openings in the floor, a positive angle of attack produces a small positive torque; hence the torque graph 120, Fig. 17a, has a positive slope throughout. This shows torsional stability. In Fig. 18, for a bridge floor cross-section 121 with the floor open across the full width, a positive angle of attack produces a small negative torque; hence the torque graph 122, Fig. 18a includes a region of small negative slope. This shows for the fully open section a small measure of torsional instability, but greatly reduced from the full measure of instability shown in Fig. 16a for the closed cross-section. The fully open section of Fig. 18, as previously shown, also retains a small measure of instability against vertical undulations such as are indicated in dotted lines in Fig. 12. The partially open section Fig. 17 is completely stable aerodynamically against both vertical undulations and angular oscillations.

Since we have described hereinbefore various forms which the open floor may take, and various positions in which the openings may be arranged, and various apertured means for spanning the openings, it will be understood that we do not intend to limit ourselves to the specific forms of the invention shown herein, but intend to claim our invention as broadly as may be permitted by the state of the prior art and the scope of the appended claim.

We claim:

A suspension bridge comprising a roadway and stiffening girders of H-shaped cross section, suspended from the main cable solely by vertical suspenders, each girder having a substantially imperforate web which acts as a wind deflector, the major part of the roadway being imperforate, longitudinally extending portions of said roadway adjacent to and between the girders providing for vertical air flow, the greater part of the area of said portions comprising openings, the width of each of said portions being equal to not less than approximately half the height of the girders, said portions being effective to eliminate objectionable undulatory motion due to wind, which the bridge would have if the entire roadway were imperforate.

HOLTON D. ROBINSON.
DAVID B. STEINMAN.